United States Patent [19]

Pollard

[11] Patent Number: 4,477,764
[45] Date of Patent: Oct. 16, 1984

[54] ENERGY GENERATING AND STORAGE SYSTEM FOR ELECTRIC VEHICLE OR THE LIKE

[76] Inventor: Earsel W. Pollard, 9943 Coddington Way, St. Louis, Mo. 63132

[21] Appl. No.: 398,759

[22] Filed: Jul. 15, 1982

[51] Int. Cl.³ ............................................... H02J 7/00
[52] U.S. Cl. ....................................... 320/62; 320/17; 307/84
[58] Field of Search ....................... 320/15, 17, 61, 62; 307/84

[56] References Cited

U.S. PATENT DOCUMENTS

| | | | |
|---|---|---|---|
| 3,530,356 | 9/1970 | Aronson | 320/61 |
| 3,874,472 | 4/1975 | Deane | 320/61 |
| 4,095,665 | 6/1978 | Armfield | 320/61 |

Primary Examiner—William M. Shoop
Assistant Examiner—Anita M. Ault
Attorney, Agent, or Firm—Richard G. Heywood

[57] ABSTRACT

An energy generating and storage system for an electric vehicle adapted to generate and recharge the principal electric storage battery to recover substantial energy losses occurring during normal operation of the vehicle, comprising multiple electric current generating means adapted for charging the principal battery means, coupling means disengagably connecting the generating means to a power train of the vehicle, and multiple switch means for operating the coupling means between an engaged, power generating condition and a disengaged inoperative condition of the multiple generating means in reponse to preselected operating conditions of the electric vehicle.

14 Claims, 6 Drawing Figures

ENERGY GENERATING AND STORAGE SYSTEM FOR ELECTRIC VEHICLE OR THE LIKE

BACKGROUND AND SUMMARY OF THE INVENTION

The invention relates generally to electric vehicles and the like, and more particularly to improvements in energy generating systems for maintaining normal operating power levels of the principal energy sources of electric vehicles.

Throughout the history of the automobile three types of power have been used in conventional vehicles—namely, petroleum (gasoline and diesel), steam and electric; although it is recognized that new solid fuel and atomic power is technologically available. While the gasoline engine has been the primary power source for vehicles for many years, the energy problems being encountered throughout the world have caused a resurgence of interest in various energy sources as alternatives to petroleum and in recent years increasing development efforts have been undertaken in all aspects of electric energy as a prime mover for vehicles.

Such developments have produced stronger, light weight vehicles using new materials and improved, long-life, rechargeable batteries substantially extending vehicle operating ranges. This objective is recognized as an essential goal to achieve wide consumer acceptance of electric powered vehicles, and to that end the need is also recognized for improvements in electric power generating systems for such electric storage batteries to thereby minimize or eliminate the need for long battery-recharging periods now required.

The principal object of the present invention is to provide an electric energy generation system for substantial recovery of electric energy and recharging of the principal storage batteries so as to eliminate the need for supplemental or auxiliary gasoline or like prime movers and minimize the need for recharging from external power sources.

Another object is to provide an energy regeneration system that will not be operative during peak power demands during starting, acceleration and heavy load conditions, but which will be operative under most normal vehicle driving conditions for sustained vehicle operation and recharging of the principal electric batteries.

Another object is to provide an energy recovery system that will be operated by multiple switch means responsive to inertial and gravitational forces imposed on the vehicle by various road and operating conditions and power demands.

These and still other objects and advantages will become more apparent hereinafter.

BRIEF DESCRIPTION OF THE DRAWINGS

In the drawings which illustrate preferred embodiments of the invention, and wherein like numerals refer to like parts wherever they occur.

DESCRIPTION OF THE PREFERRED EMBODIMENT

Figure 1:
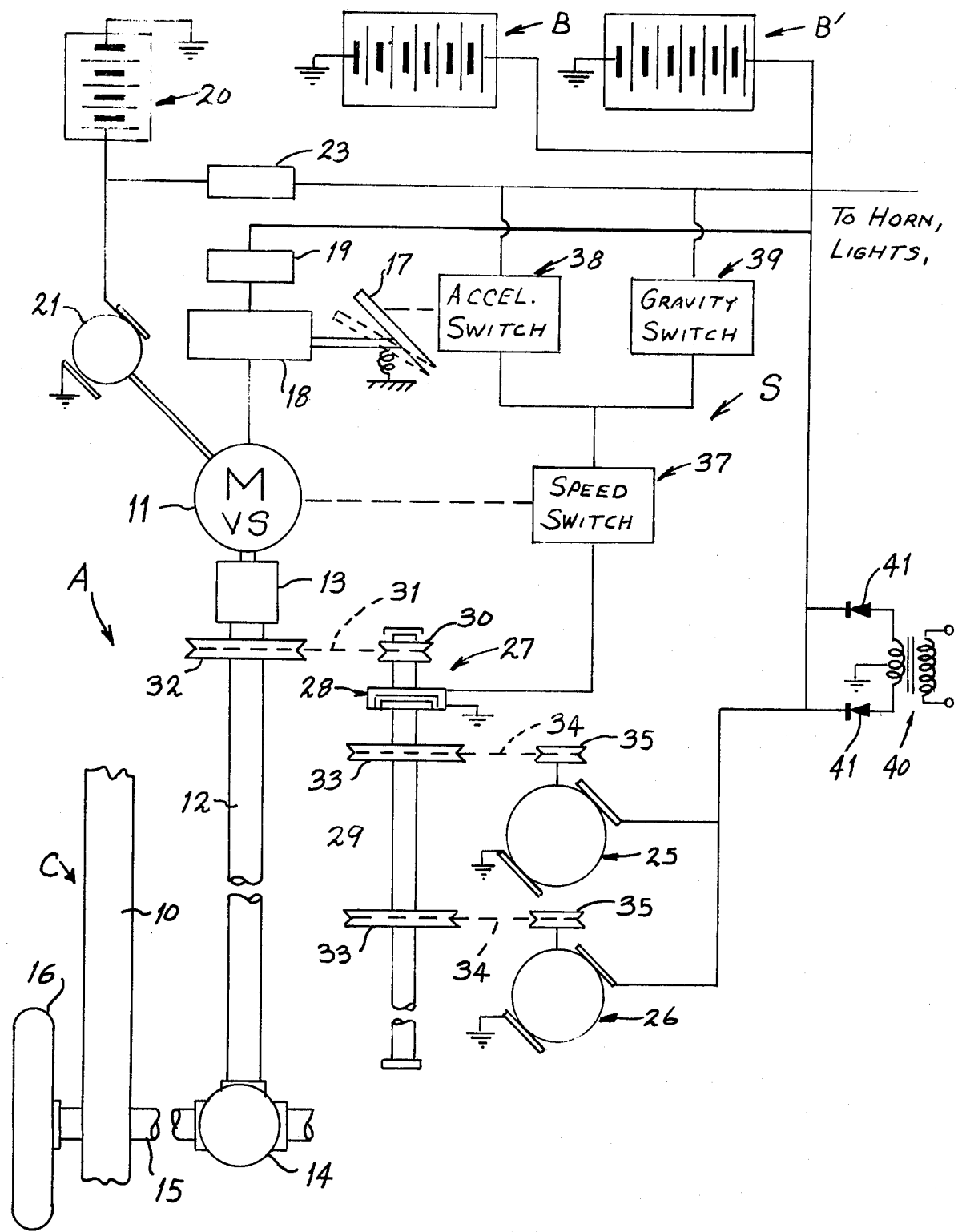
FIG. 1 is a diagrammatic illustration of an energy recovery and storage system for an electric vehicle or the like, FIG. 2 is an enlarged diagrammatic view showing the closed position of one type of inertia and gravity switch utilized in the FIG. 1 system.
Figure 2:
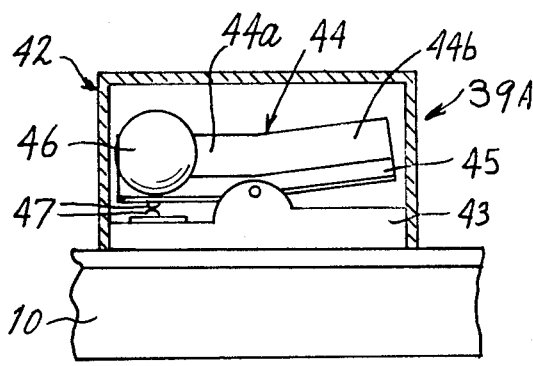
Figure 3:
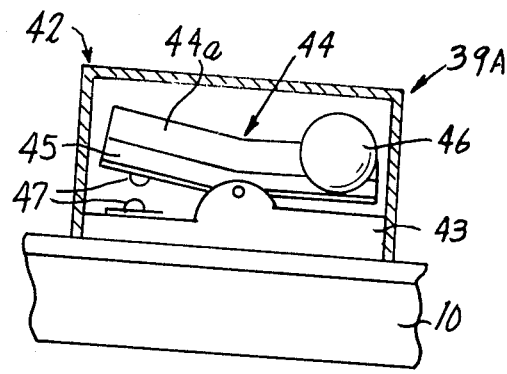
FIG. 3 is a diagrammatic view showing the gravity switch of FIG. 2 in its open position.

Referring to FIG. 1 of the drawings, the energy generating and storage system S of the present invention is diagrammatically illustrated in association with an electric vehicle A having typical large capacity electric storage batteries B and B' supplying the primary or principal source of locomotive power for operation of the vehicle A. The vehicle A has a conventional chassis C including longitudinal, horizontal frame members 10, and the primary drive train includes a variable speed electric motor 11 which is coupled to the usual drive shaft 12 through a conventional transmission 13. The drive shaft is connected through a differential gear means 14 to axles 15 for turning the wheels 16 in a conventional manner. It will be understood that the main power train from the motor 11 through wheels 16 is conventional and forms no part of the present invention. Similarly, the transmission 13 and its controls are conventional, and the accelerator 17 for controlling the speed of and power delivery to the electric motor 11 functions through a conventional controller means 18 which regulates the amplitude of D.C. current applied to the electric motor 11 and thus the torque of the drive train to the wheels 16. Voltage regulating means 19 are also provided between the main storage batteries B and B' and the controller means 18.

A separate, standard 12 volt battery 20 is utilized in the present system to provide a secondary power source for operating the vehicle electric accessories, such as the horn, lights, cigarette lighter, power windows, etc., and this battery 20 is maintained in a charged condition in the normal operation of the vehicle A by a conventional three or six phase alternator or electric generating means 21 driven by the electric motor 11 or from the main power train in a conventional manner. Conventional A.C. alternators 21 utilize internal rectifiers (not shown) to convert the A.C. to D.C. for recharging the battery 20 and for the direct current requirements of the horn, lights, etc. and voltage regulator 23 would be used in the circuit. It should be noted that the separate battery 20 is not used as a power source for the vehicle A and permits the emergency and safety accessories to be fully operative at all times. One of the primary functions of the battery 20 is to provide a secondary power source for operating the primary energy generating and storage system S of the present invention, as will now be described.

The energy generating and storage system S for the main storage batteries B and B' includes multiple or large capacity alternators or electric current generators, a pair of three or six phase alternators 25 and 26 having internal diode rectifiers being shown for disclosure purposes. These alternators 25 and 26 are connected to a supplemental or auxiliary power train 27 having an electric clutch 28 or like coupling means responsive to preselected vehicle operating conditions for engaging the auxiliary power train 27 to drive the alternators 25 and 26. The power train 27 includes a main shaft 29 journaled in suitable bearings and having a small pulley wheel 30 driven by friction drive belt 31 from a larger pulley wheel 32 on the main power train (12). Similarly, the auxiliary drive shaft 29 is coupled by large pulleys 33 through drive belts 34 to the small pulley wheels 35 of each alternator armature. The step-up ratios of coupling between the main and auxiliary drive shafts 12 and 29 and between the drive shaft 29 and alternators 25 and 26 are calculated to obtain optimum electric energy generation with minimum additional load on the main electric motor 11, and the electric clutch 28 operates to engage the auxiliary drive shaft 29 for power generation during certain operating conditions and is in a disengaged, inoperative condition during other vehicle operating conditions, as will now be defined.

The energy recovery and storage system S includes multiple switch means for controlling the operation of the electric clutch 28. A normally open speed control switch 37, which may be integrated with the speedometer (not shown), is responsive to the operating speed of the vehicle A and is closed when operating in excess of a preselected rate of speed, such as 10 mph. This switch 37 is in the direct (series) circuit with the electric clutch 28. An accelerator switch 38 is coupled to the accelerator pedal 17 or linkage therefrom and is normally closed, as when the accelerator 17 is partially or fully released. This switch 38 is opened when the accelerator 17 is depressed to a substantially full position or to a sufficient degree to demand a greater energy load for operating the vehicle A. Another important control switch 39 is a gravity and inertia type switch, as illustrated more fully in FIGS. 2-6 to be described. This switch 39 is normally closed on level and downhill inclinations of the vehicle A and is open on uphill road grades. The accelerator switch 38 and gravity switch 39 are connected in parallel between the secondary battery 20 and the speed switch 37 whereby a closed condition of the speed control switch 37 conditions the electric clutch circuit for operation dependent upon a closed condition of either of the switches 38 or 39. It will be apparent that when the electric clutch 28 is engaged and the auxiliary drive train 27 is operating to turn the alternators 25 and 26, A.C. electric energy is being generated and rectified into direct current for use in the power demands of the vehicle A and/or for storage in the principal storage batteries B and B'. This circuit may also include a step-down transformer 40 forming an auxiliary A.C. recharging station having diode rectifiers 41 for converting A.C. to D.C. as may be conventionally required from time to time for recharging the main batteries B and B'.

Referring now to FIGS. 2-6 wherein three types of gravity switch 39A, 39B and 39C are illustrated, it will be understood that this type of switch is responsive both to gravity and inertia in moving between an open switch condition, as when the vehicle A is on an uphill grade or in a starting or accelerating (passing) mode and large power demands on the main batteries B and B' are made, and a closed switch condition, as when the vehicle A is operating on a downhill grade or essentially level (horizontal) roadway and power demands on the batteries B and B' are minimal and the extra alternator load on the electric motor 11 will not hinder good vehicle performance. In the FIG. 2 and 3 embodiment, the gravity switch 39A comprises a switch housing 42 having a base 43 suitably mounted on the vehicle A, such as the frame 10. The switch housing 42 contains a hinged or rockable angular channel member 44 pivotally mounted on the base 43 and including a forward switch-closing segment 44a and a rearward switch-opening segment 44b having a continuous track 45 for a rolling ball element 46 or like gravity mass. The base 43 is angularly adjustable within the housing 42 or the entire gravity switch 39A is angularly adjustably mounted on the frame 10 so that, in the absence of an inertia force, the gravity mass 46 will move forward to normally position the forward switch-closing segment 44a at a slight downward angle and close the switch contacts 47 when the frame 10 is horizontal. Thus, it will be clear that the gravity switch 39A is normally closed when the vehicle A is operating on a downgrade or on a level roadway, and will open on a predetermined upgrade, such as 3 to 5 degrees. Similarly, it is clear that inertial forces will normally act on the ball element 46 to close the switch 39A during braking action and to open the switch 39A during starting and forward acceleration of the vehicle.

Figure 4:
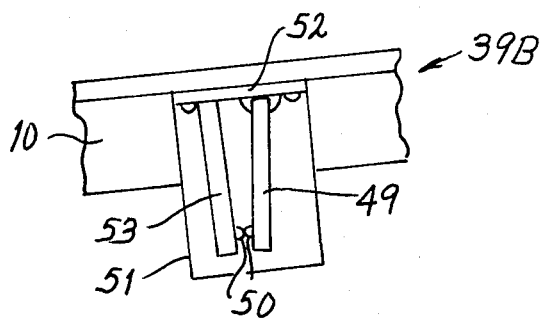
FIG. 4 is an enlarged diagrammatic view showing the closed position of a second type of inertia and gravity switch.
Figure 5:
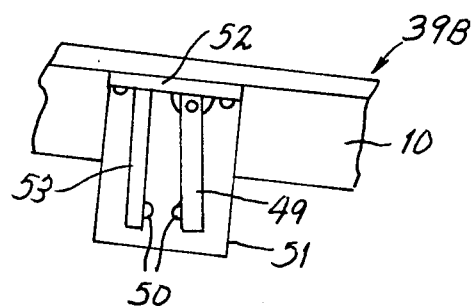
FIG. 5 is a diagrammatic view showing the open position of the gravity switch of FIG. 4.

Another type of gravity switch 39B, illustrated in FIGS. 4 and 5, utilizes a swinging pendulum mass 49 responsive to both gravity and inertia for opening and closing switch contacts 50. The housing 51 and base 52 thereof are adjustably secured to the frame 10 or the like and include a fixed depending switch arm or segment 53 carrying one of the switch contacts 50. The pendulum member 49 is hinged or swingably connected to the base for movement between a forward switch-closing position (FIG. 4) and a rearward switch-opening position (FIG. 5).

Figure 6:
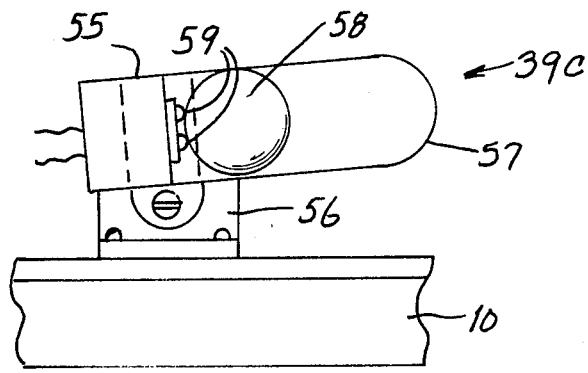
FIG. 6 is an enlarged diagrammatic view showing the closed position of a third type of inertia and gravity switch.

Referring now to FIG. 6, another type of well-known gravity switch 39C comprises an angularly adjustable switch housing 55 and base 56 mounted on the frame 10, the housing including an elongated tubular chamber 57 forming a track retaining a ball or mercury type gravity mass 58 normally located in a forward downward position closing switch contacts 59. From the foregoing, it will be understood that the gravity and inertia (pendulum) action and effect of the switches 39A, 39B and 39C is the same in the operation of the energy system S.

In operation, and starting the electric vehicle A from a stopped condition on a level roadway, the speed control switch 37 will be open and the accelerator switch 38 and the gravity switch 39 will be closed. The gravity switch 39 will immediately open at the initial movement of the vehicle A by reason of the inertia force acting on the ball element 46, the pendulum switch element 49 or the ball or mercury mass 58 causing any of these elements to move rearwardly. Depressing the accelerator 17 to start the vehicle A immediately closes switch 38 inasmuch as starting movement of the vehicle A requires one of the largest power load demands on the batteries B and B' since the electric drive motor 11 develops its highest torque (turning movement applied to the drive train and wheels) at starting. The vehicle A thus accelerates rapidly to a normal driving speed and, after the selected forward speed of 10 mph is attained, the speed switch 37 closes thereby conditioning the energy system S for operation depending on the functioning of the accelerator switch 38 and gravity switch 39 which are connected in parallel circuit between auxiliary battery 20 and the speed switch 39 to control the operation of the electric clutch 28 for engaging the drive train 27 to the power generators 25 and 26 and the like.

The accelerator switch 38 is open when the accelerator 17 is substantially fully depressed and greater power demands are called for due to speed or load requirements as when the vehicle is passing or going uphill on a substantial grade, but during normal driving conditions with small or intermediate power demands the accelerator 17 will be in an intermediate position (as shown in full lines in FIG. 1) and close the switch 38 to engage the electric clutch 28 and activate the generators 25 and 26 to recharge the batteries B and B' and/or supply the power needs for operation of the vehicle A. This intermediate position will occur when driving the vehicle on level or low grade roadways. The accelerator switch 38 is also closed and the electric clutch circuit completed when the accelerator 17 is released and the vehicle A is moving at a rate in excess of 10 mph as when the vehicle is coasting regardless of the grade of the roadway.

The gravity switch 39 is normally closed when the vehicle A is on a level or downgrade raodway, and will open on an upgrade surface exceeding a predetermined angle by reason of the gravity mass (46,49,58) moving rearwardly to a switch-opening condition.

It will be readily apparent that the energy system S provides optimum power generation for continued operation of the vehicle A over extended periods or distances without requiring downtime for recharging the batteries B and B' from an external source (40). The alternators 25 and 26 or like electric current generators are designed to exceed the normal operating current requirements of the vehicle A and thus provide the basic power during normal operation while recharging batteries B and B'. However, the multiple switching system for electric clutch 28 anticipates maximum power requirements from batteries B and B' in response to grade or load demands. For instance, during normal vehicle operation on level roadways, both the accelerator switch 38 and gravity switch 39 are closed to complete a circuit through speed switch 37 to the electric clutch 28 so that the power train 27 will be operative to generate power, but on entering an upgrade the gravity switch 39 will be opened so that the vehicle A is conditioned to be immediately responsive to accelerator demand for operating power by depressing the accelerator 17 to open switch 38 and disengage clutch 28 to remove the alternator load or drag on the electric motor 11.

In summary, the alternators 25 and 26 will be turning to generate power for operation or recharging the batteries B and B' whenever the vehicle is on a downgrade or operating on a level roadway unless a large power demand is called for by depressing the accelerator 17 in which case the accelerator switch 38 will be open and the inertial effect on the "pendulum" mass will open gravity switch 39. The alternators 25 and 26 will also be turning whenever the vehicle A is coasting irrespective of the grade of the roadway since the accelerator 17 will be released and the switch 38 will be closed.

It will be understood that specific sizes and numbers of alternators may be modified depending upon the power requirements (weight, etc.) of the vehicle A, and that other changes and modifications may be apparent to those skilled in the art.

What is claimed is:

1. An energy recovery and storage system for an electric vehicle having principal electric storage battery means as a primary source of electric power for operating the main power train of the vehicle, comprising multiple electric current generating means adapted for charging said principal battery means, coupling means between said multiple generating means and said main power train, and multiple switch means responsive to preselected vehicle operating conditions for controlling the operation of said coupling means to shift said multiple generating means between a mechanically engaged and power generating condition and a disengaged inoperative condition.

2. The energy recovery and storage system according to claim 1 in which said multiple switch means include a speed responsive switch for conditioning said system for operation in response to a preselected minimum vehicle speed.

3. The energy recovery and storage system according to claim 1 in which said multiple switch means include an accelerator controlled switch for conditioning said system for operation in response to preselected minimum acceleration power demands on said principal battery means.

4. The energy recovery and storage system according to claim 1 in which said multiple switch means include a gravity and inertia responsive switch for conditioning said system for operation in response to vehicle operation on substantially level and downgrade roadway angularity conducive to optimum vehicle performance and low power demands on said principal battery means.

5. The energy recovery and storage system according to claim 1, which includes secondary storage battery means and electric current generating means therefor connected to said main power train and being adapted for operating electric accessories of said vehicle.

6. The energy recovery and storage system according to claim 1 in which said coupling means include an auxiliary power train and electric clutch means adapted to be engaged and disengaged from a driving connection between said main and auxiliary power trains responsive to operation of said multiple switch means.

7. The energy recovery and storage system according to claim 6 including secondary storage battery means for providing a secondary power source for operating said electric clutch means through said multiple switch means.

8. The energy recovery and storage system according to claim 7 in which said multiple switch means include a speed responsive switch adapted to close in response to a preselected forward vehicle speed to condition the circuit between said secondary battery means and said electric clutch means for operation, and at least one other switch means adapted to be closed to complete the circuit to said electric clutch means in response to other vehicle performance criteria indicative of low power demands on said principal battery means.

9. The energy recovery and storage system according to claim 8 in which said one other switch means is an accelerator switch that is closed during substantially normal vehicle operation and coasting conditions and is opened during substantially full acceleration and power load demands upon said principal battery means.

10. The energy recovery and storage system according to claim 8 in which said one other switch means is a gravity and inertia responsive switch that is closed on substantially level and downgrade roadway operations of said vehicle and is opened on upgrade roadways of predetermined angularity and responsive to inertia produced by acceleration of the veicle.

11. The energy recovery and storage system according to claims 4 or 10, in which said gravity and inertia switch comprises a switch housing mounted on said vehicle and having a movable gravity mass normally in a switch-closing position when said vehicle is on a level roadway.

12. The energy recovery and storage system according to claim 8 in which said multiple switch means include said speed responsive switch and two other switches in parallel with each other and both being in series with said speed switch in the circuit to said electric clutch means, one of said two switches being an accelerator switch closed in response to minimum acceleration power demands and the other of said two switches being a gravity and inertia responsive switch being normally closed on substantially level and downgrade roadways.

13. The energy recovery and storage system according to claim 6 in which said auxiliary power train has a driven connection from said main power train in a preselected step-up ratio, and a step-up ratio driven connection is also provided between said auxiliary power train and said multiple generating means, said multiple generating means being constructed and arranged to produce electric current in excess of the electric power demands of the vehicle during normal long-distance driving performance.

14. In an electric vehicle of the type having principal electric storage battery means as a primary source of direct current voltage, a variable speed direct current motor and main drive train driven thereby, and a movable accelerator pedal and accelerator-responsive controls for varying the amplitude of electric power to operate said motor at said variable speeds and power level demands of said vehicle and secondary battery means and current generating means therefor connected to the main power train for operating electric accessories of said vehicle; the improvement comprising an energy recovery and storage system comprising primary electric current generating means adapted for charging said principal battery means, coupling means including an auxiliary power train and electric clutch means adapted to be engaged and disengaged from a driving connection between said main and auxiliary power trains for predetermined operation of said primary generating means, said secondary battery means providing the main power source for said electric clutch means, and multiple switch means responsive to preselected vehicle operating conditions for completing the circuit between said secondary battery means and said electric clutch for shifting said primary generating means between an engaged and power generating condition and a disengaged inoperative condition.

* * * * *